Sept. 6, 1960     E. N. SHAWHAN     2,951,990
FREQUENCY SELECTIVE CIRCUITS
Filed Oct. 10, 1956     3 Sheets-Sheet 1

INVENTOR.
ELBERT NEIL SHAWHAN
BY
ATTORNEYS

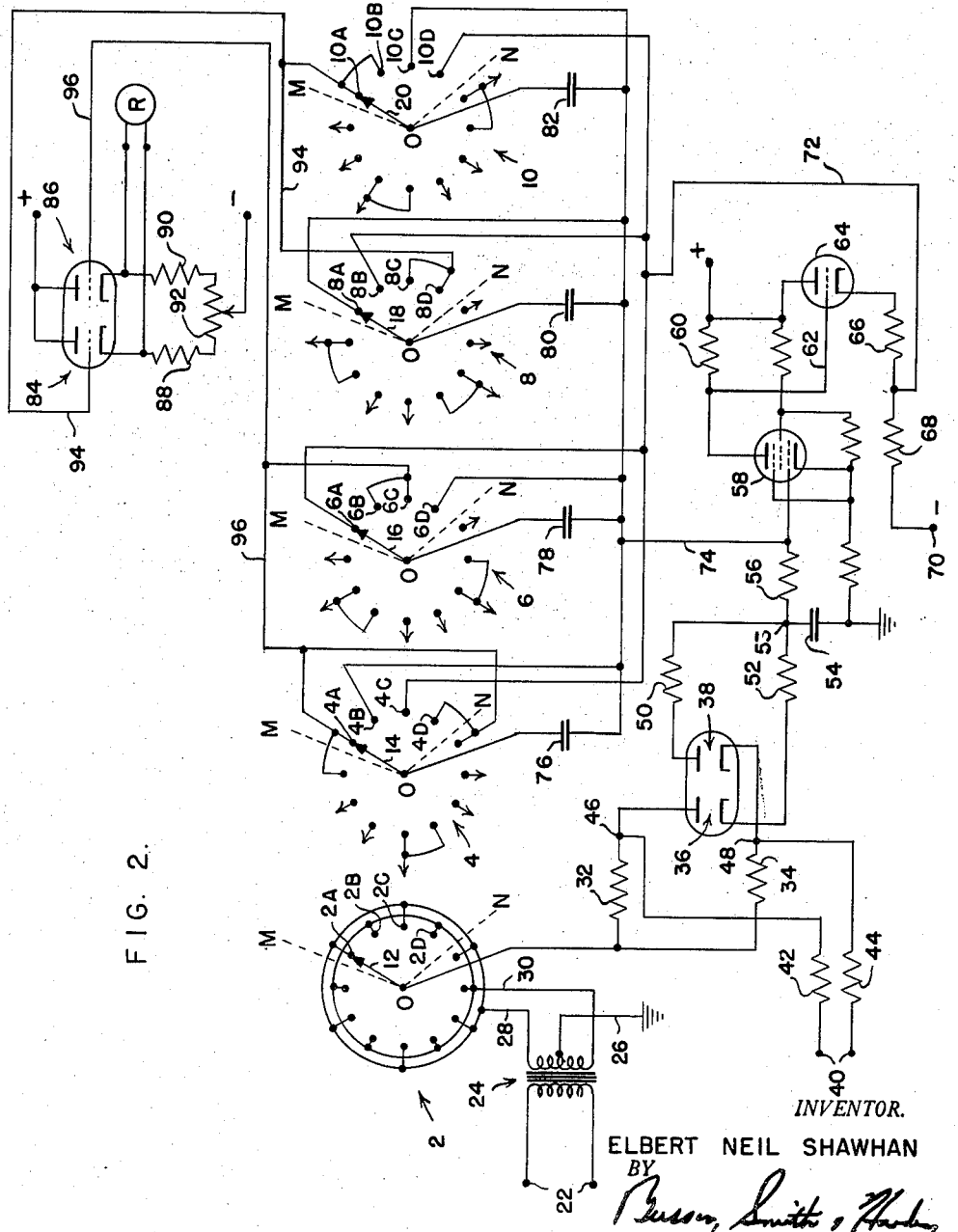

INVENTOR.
ELBERT NEIL SHAWHAN
ATTORNEYS

United States Patent Office 2,951,990
Patented Sept. 6, 1960

2,951,990
FREQUENCY SELECTIVE CIRCUITS

Elbert Neil Shawhan, Newtown Square, Pa., assignor to Sun Oil Company, Philadelphia, Pa., a corporation of New Jersey Filed Oct. 10, 1956, Ser. No. 615,088
2 Claims. (Cl. 328—186)

This invention relates to frequency selective circuits and has particular reference to a system for detecting weak signals of fixed frequency in the presence of strong noise.

In my Patents Nos. 2,526,509 and 2,559,173 there are described systems for the detection of weak signals such as arise in scanning the spectrum in a Raman spectrometer. In accordance with said patents, synchronous rectifier systems are used followed by resistance-capacitance low-pass filters developing direct voltages proportional to the signal amplitudes. If the signal level changes slowly, a high degree of signal to noise discrimination is made possible by using a filter having a long time constant. However, when the signal's source is a photomultiplier tube receiving chopped light from a spectrograph as the spectrum is scanned, the level may change rapidly at times, the nature of the level changes depending upon the sharpness of the lines in the spectrum and the speed of scanning. Generally, it is desirable to scan the spectrum as rapidly as possible without serious distortion of the spectral line shapes. The noise rejection filter must pass a band of frequencies, centered at the light chopping frequency, in order to follow the changes in amplitude. Hence, the ideal filter pass characteristic would have a flat top, vertical sides, and a pass band just wide enough to accept the modulation components necessary to show the true line shape.

The problem is of special interest in the use of Raman spectra for quantitative analysis, where the intensities are very low and a high order of noise rejection is required. Many of the lines are inherently broad and tend to overlap if necessary modulation components are lost. It is then difficult to determine the true line intensities which are used to measure the abundancies of the corresponding components present in the sample under observation.

Perhaps the disadvantage of the former circuits may be best expressed by saying that during their operation they are continuously affected by past history. Using a photocircuit having a long time constant, it will be evident that changes occurring at a given moment will necessarily be superimposed upon conditions arising from past history such that, if in the recent past history there had been a large signal, that signal would persist in the form of a potential on a capacitance in the RC circuit, whereas, conversely if a low level existed in the recent past history there would be correspondingly low potential existing as a result.

In accordance with the present invention improvements are effected which, essentially, eliminate the past history of operation and at each particular recording time reflect only the input conditions existing during a period of relatively short duration assignable to that time. Further, the band-pass characteristics are more nearly those desirable, as indicated above, for the segregation of signals such as arise from the scanning of a Raman spectrum. Briefly stated, there is involved sequential integration the nature of which will become more apparent hereafter.

The invention will now be described with reference to the accompanying drawings in which:

Figure 2 is a wiring diagram showing an apparatus provided in accordance with the invention;

Figure 1:
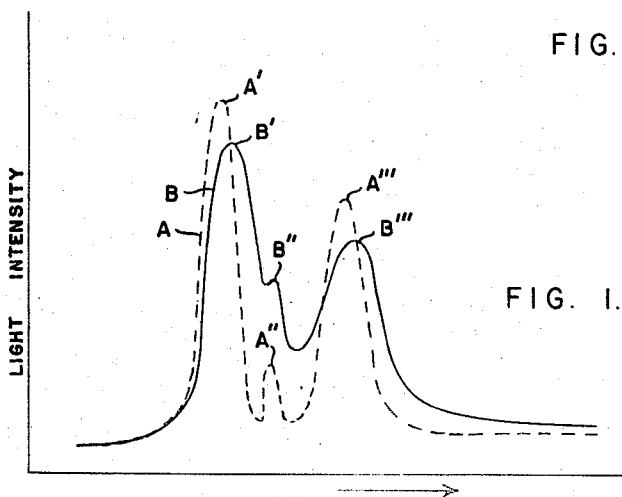
Figure 1 is a diagram explanatory of the problems involved and showing, in particular, the results of scanning of a portion of a Raman spectrum in accordance with my prior patents.

Reference may be first made to Figure 1 to show the nature of the problem involved and solved in accordance with the present invention. In this graph, the abscissa may be considered as the direction of scanning, and the ordinate light intensity arising in a Raman spectrometer. A portion of the true intensity curve is indicated at A, and as illustrated comprises a pair of major peaks A' and A''' between which there occurs a minor peak A''. Utilizing the type of apparatus described in my patents referred to above, a very accurate rendition of the true intensity curve may be secured, against intense background noise, but through the use of an RC circuit having a long time constant and with scanning taking place at a corresponding very low rate. If the rate of scanning is speeded up, the time constant remaining the same, there will be secured a response such as pictured at B in Figure 1. It will be noted that the peak A', in this typical example, is reasonably well rendered as the peak B', and the peak A''' is rendered in reasonably satisfactory fashion as the peak B'''. However, the small peak A'' immediately following the large peak A' is not only substantially lost in the rendition at B'' but the relative apparent intensity with respect to the intensities of the other peaks is very misleadingly represented, the small peak B'' having an amplitude which, as shown, is approximately double the amplitude of peak A'' while the other peaks B' and B''' are less than the magnitudes of the true peaks corresponding thereto. It is obvious that proper quantitative deductions could not be made from a response curve such as B.

What is evident is that the previous history of the operation of the apparatus is strongly reflected in the improper rendition of the peak A'', the corresponding peak B'' having its amplitude due primarily to the fact that the apparatus was still recovering from its response to the large peak A'. Furthermore, involved in a failure to show true rendition of peaks is the matter of inadequate frequency response of the system used. An excessively high degree of frequency discrimination against noise simultaneously involves discrimination against modulating frequencies of the chopping frequency to the end that rapid changes in the spectrum are not properly reproduced.

The minimizing of these difficulties will become apparent following the description of an apparatus provided in accordance with the present invention and particularly shown in Figure 2.

While there has been particularly mentioned the application of the present invention to the improved recording of Raman spectra, since this involves a very full utilization of the advantages of the invention, it will become apparent that the invention is quite broadly applicable to the indication or recording of signals against background noise or interfering signals whenever it is possible to provide as the desired signals modulations of predetermined frequency in such fashion that synchronous rectification can be provided by the utilization of a synchronizing wave of corresponding frequency. Thus, any slowly varying original input signal may be chopped to provide a corresponding alternating signal modulated in accordance with the original signal. By providing a synchronizing wave at the chopping frequency, synchronous rectification can be accomplished. This, basically, is accomplished in accordance with my patents referred to above. In the diagram there will, accordingly, not be described in detail the particular apparatus utilized for the production of the input signals to the apparatus constituting the present invention. Reference may be made to said patents, for example, to show how the output of a Raman spectrometer, involving slowly varying signals, may be chopped to provide an alternating signal at a predetermined frequency with concurrent production of a synchronizing wave at the same frequency.

Referring specifically to what is shown, there are indicated at 2, 4, 6, 8 and 10 five switches which are synchronously operated to provide corresponding steps of their movable contact arms 12, 14, 16, 18 and 20, which may be secured to a common shaft. As illustrated, each switch comprises twelve contact positions, but these represent three repeats of sequences of four contacts in each switch and it will suffice for purposes of description to consider what occurs in the angular range represented at MON, the sequence being then repeated. The contacts of the four steps of each switch in this range are designated by the switch numeral followed by the successive letters A, B, C and D. As shown, the contact arms are engaging the contacts designated by the letter A.

The contact arms 12, 14, 16, 18 and 20 are driven by a conventional stepping mechanism rapidly between successive contacts and remain on the successive contacts for periods which may typically range from about two seconds to thirty seconds in the use of the apparatus in connection with a Raman spectrometer. This period of contact may occur, of course, very briefly dependent upon the particular use to which the apparatus is put.

The input signals are provided at terminals 22 and may, for example, be the signals chopped at a particular fixed frequency and arising, for example, from a multiplier photocell and associated amplification devices. Again considering the application of the invention to a Raman spectrometer, the chopping frequency might typically be of the order of seventy-five to eighty cycles per second. The alternating signal at such frequency is modulated in accordance with the original signal, such as corresponds to light intensities, which is to be measured.

The alternating signals from terminals 22 are fed to the transformer 24, the center of the secondary of which is grounded while its terminals are connected at 28 and 30 alternately to the contacts of the series 2A, 2B, 2C and 2D. It will be evident that this involves a reversal of phase of the signals delivered to the contact arm 12 in its successive stepped positions.

The contact arm 12 is connected through resistors 32 and 34, respectively, to the anode of a diode 36 and to the cathode of a diode 38. A synchronizing wave, desirably a square wave, having the same frequency as the signal input at terminals 22, is introduced at terminals 40 and delivered through resistors 42 and 44, respectively to the anode of diode 36 and cathode of diode 38. The anode of diode 38 and the cathode of diode 36 are respectively connected through resistors 50 and 52 to a junction 53 which is connected to ground through a small capacitor 54. In the present apparatus this capacitor 54 is just large enough to suppress strong noise peaks and switching transients. If reference is made to my patents mentioned above, it will be noted that in the position corresponding to capacitor 54 there are, in the circuits of the patents, provided large capacitors providing the capacitances of RC circuits of large time constants. The useful output signals are then those appearing at a point corresponding to the junction 53 in the present apparatus. The potential occurring at such position is then the one which reflects the past history and provides frequency discrimination as described in said patents.

In contrast, in the present apparatus, the signals appearing at junction 53 and resulting from synchronous rectification are utilized quite differently.

Junction 53 is connected through a high resistance 56 to the control grid of a pentode 58 which is provided with an anode load resistor 60, the anode being connected at 62 to the grid of a triode 64, the cathode of which is connected to a negative potential terminal 70 through the series arrangement of resistors 66 and 68, the junction of which resistors is connected at 72 to the switch contacts 4C, 6A, 8B and 10D. The control grid of the pentode 58 is connected at 74 to terminals of capacitors 76, 78, 80 and 82, the other terminals of which are respectively connected to the switch arms 14, 16, 18 and 20. The capacitors just described have high capacitance values, for example, of the order of 0.5 microfarads. Considering any of these capacitors switched into the circuit by connection to the junction of resistors 66 and 68, it will be evident that the circuit including the pentode 58 and triode 64 provides an integrator of known type in which the value of the capacitance is multiplied by the gain of the pentode. As will appear, the capacitors are selectively switched into the integrating circuit and then accumulate potentials representing integration of the signals appearing at the junction 53.

It will be noted that the contacts 4B, 6D, 8A and 10C are connected to the connection 74 joined to the lower terminals of the capacitors 76, 78, 80 and 82 so that when the corresponding switch arms engage these contacts the capacitors are short-circuited and discharged.

A pair of triodes 84 and 86 are connected as cathode followers in conjunction with cathode resistors 88 and 90 which are connected together through the resistance of a potentiometer 92 the adjustable contact of which is connected to a negative potential supply terminal and is adjustable for purpose of balancing. The grid of triode 84 is connected at 94 to the contacts 8C, 8D, 10A and 10B. The grid of triode 86 is similarly connected at 96 to the contacts 4A, 4D, 6B and 6C. The output to a recorder R is taken from the cathodes of the triodes 84 and 86.

The operation may now be described with reference to Figure 3. At the top of that figure there are indicated by the letters A, B, C and D periods corresponding to the steps of the switches having corresponding letters. As previously indicated, the complete cycle is finished in four steps and Figure 3 indicates what may typically occur through three complete cycles. Beneath the letters there are indicated plus and minus signs arbitrarily used to indicate the reversals of input effected in the successive steps by the movements of the arm 12 of switch 2. It may be assumed that during the periods under discussion the input function appearing as a modulation of the alternating input at terminals 22 may have the form of the curve indicated at F. Corresponding signals in the way of rectified pulses will appear at junction 53, possibly smoothed out somewhat by the small capacitance at 54 which, however, is not depended upon for rectification. Accordingly signals generally corresponding to F in average values but at the chopping frequency may be considered as appearing at junction 53.

The stepped curves designated by numerals 76, 78, 80 and 82 correspond to the charge conditions of the capacitors of corresponding numbers. The stepped curves at 86 and 84 correspond to the potentials appearing at the grids of the respective triodes 86 and 84 and, of course, correspond also to the potentials of the cathodes of these triodes.

Assuming that the switch arms are in the positions A, the conditions existing at the capacitors will be as indicated in the column A. Capacitor 76 will be holding a charge previously received and its potential will be applied to the grid of triode 86. The portions of the curves indicating the results of occurrences prior to the period A are indicated in dotted lines.

The capacitor 78 is connected to contact 6A and consequently to the line 72 which is connected to the junction of resistors 66 and 68. It is, accordingly, receiving the output from the integrator and a potential is built up on capacitor 78 corresponding to the average value of the function F during the period A.

The capacitor 80 is short-circuited and accordingly its potential is zero.

Capacitor 82 is holding a charge imposed by the past history of operation and the potential of this capacitor is applied through contact 10A to the grid of triode 84.

Following the termination of the period A which, as previously stated, may typically be of the order of two to thirty seconds, the switch arms are shifted to their positions B. When this occurs capacitor 76 is short-circuited. Capacitor 78 holds the charge provided during the preceding integration period and this charge, diagrammed as positive, is applied to the grid of triode 86. Capacitor 80 is now connected to the integrator and receives a negative charge in view of the reversal effected by the switch 2. Capacitor 82 continues to hold the charge from a previous operation and its potential is applied to the grid of triode 84.

In the next period C, capacitor 76 undergoes charging from the integrator, capacitor 78 retains a charge previously applied and its potential is delivered to the grid of triode 86, capacitor 80 retains the charge resulting from the previous integration and applies this to the grid of triode 84, and capacitor 82 is short-circuited.

In the period D, capacitor 76 retains the charge imposed thereon during the preceding integration period and its potential is applied to the grid of triode 86. Capacitor 78 is discharged by short-circuiting. Capacitor 80 retains the charge previously held thereon and continues to apply its potential to the grid of triode 84. Capacitor 82 is connected to the integrating circuit and acquires a charge corresponding to the average value of the function F in the period D.

Figure 3:
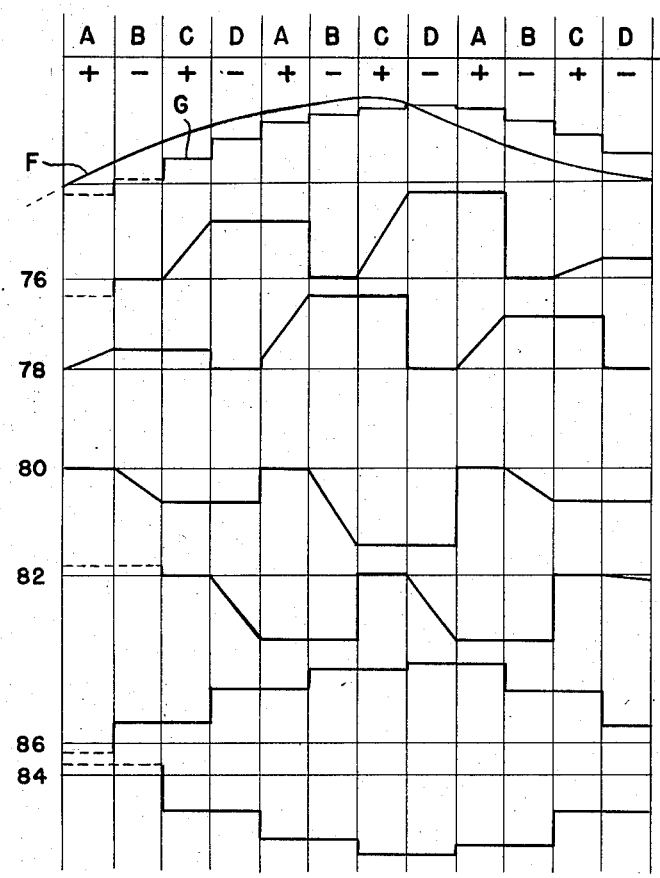
Figure 3 is an explanatory diagram showing, in particular, a comparison of responses of the present apparatus and the apparatus of my patents to a step function.

In successive periods these operations are repeated and may be followed in Figure 3. The output delivered to the recorder R corresponds to the algebraic difference of the potentials of the grids (or cathodes) of triodes 86 and 84, and this output is represented, to a scale corresponding to the function F, by the stepped curve G.

It will be evident that the stepped curve G has the general shape of the function F, but is, substantially, delayed with respect to F approximately by a time interval of two of the step subperiods. This, of course, may be taken into account in interpretation. What is important is that any particular step on the curve G does not reflect the past history of the function F going back beyond two of the subperiods. This result is achieved by reason of the fact that each capacitor is discharged during each of the repetition periods. Accordingly, if scanning takes place at not too rapid a rate, such peaks or events as are represented by A" in Figure 1 will not be missed and will be accurately reproduced both as to the time of their appearance and amplitude.

Despite the type of operation which has been described, the same order of discrimination against spurious signals or noise is achieved as with the circuits of the type described in my prior patents. In fact, there may be compared the operations occurring in the present apparatus when a subperiod has a particular time value T with the operations which occur in the use of the prior circuits in which the time constant RC is equal to T. It is found that with the present apparatus, there is a severalfold improvement in fidelity of reproduction of a theoretical function with at least as good discrimination against noise and other spurious signals.

Figure 4:
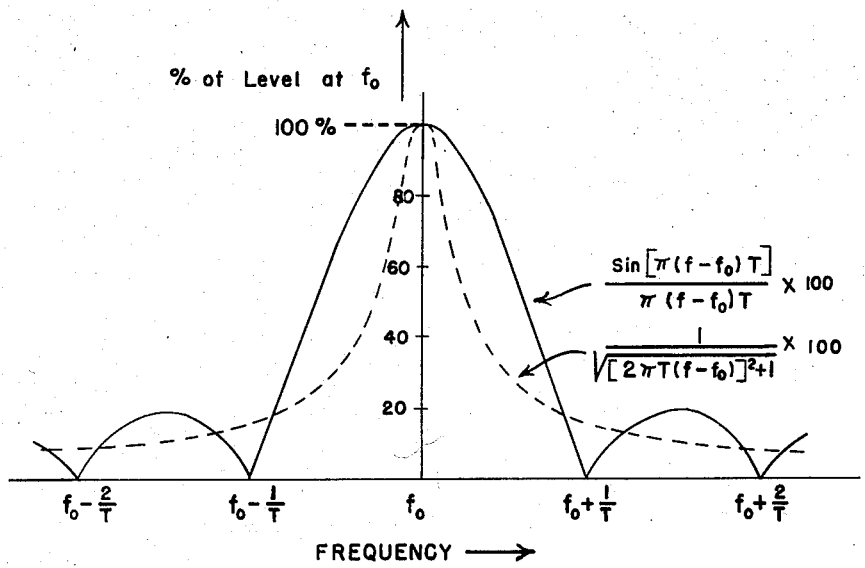
Figure 4 is a diagram showing the effective filter characteristics of an apparatus provided in accordance with the invention.

As indicated previously, the improved apparatus provides, in effect, a filter which has a desirable broadened pass band to include the side band frequencies which modulate the chopping frequency in the rendition of rapid changes in the function being scanned. Figure 4 shows a comparison of the filter characteristics in which the maximum level percentages are comparably scaled and the plot is against frequency. The dotted curve represents the frequency response of a synchronous detector with an RC filter provided in accordance with said patents, and in which the product RC is equal to T, a subperiod or integrating interval of the present apparatus. The full line curve represents the frequency response of the present apparatus. The pertinent theoretical functions expressing these characteristics are as indicated on the figure. It will be noted that the central pass band of the present apparatus is substantially broader than that of the prior apparatus and satisfactorily approximates the theoretically desired rectangular pass band. The subsidiary pass bands indicated in connection with the present apparatus are of little consequence and do not substantially detract from the discriminating characteristics thereof.

Figure 5:
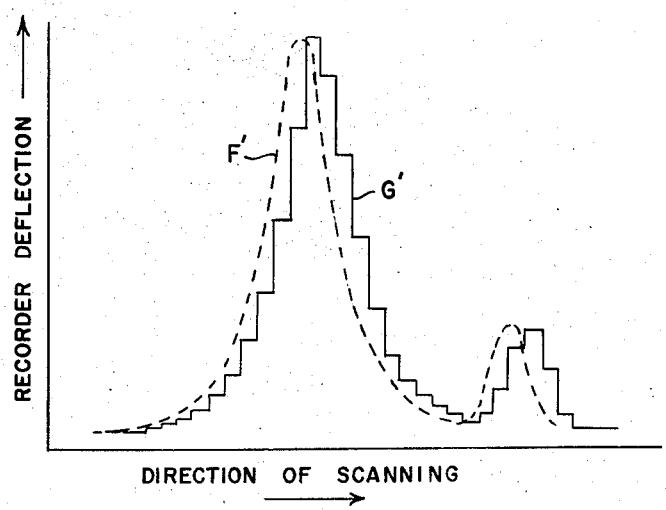
Figure 5 is a diagram showing the response of the present apparatus to signals such as those arising from scanning of a Raman spectrum.

While the relation of a step function delivered to a recorder to the original function scanned has been indicated in Figure 3, Figure 5 shows more typically the step response G' secured in the scanning of a function F' involved in, for example, the scanning of a Raman spectrum. However, for simplicity of showing, the number of steps illustrated in Figure 5 is considerably less than the number typically obtained, and consequently the correspondence of the step function to the original function is even better than illustrated. As has been pointed out, there is a delay of the step function relative to the original function, but this is of constant amount and may be taken into account in interpretation. Furthermore, the step function is desirable since the area thereunder is readily measured and it is a measure of the intensity of the original function.

What is claimed is:

1. In combination, means providing a signal slowly varying with time, said means comprising a synchronous rectifier receiving an alternating signal varying with time and a synchronizing signal and providing said signal slowly varying with time; means responsive to said last-mentioned signal providing successive outputs corresponding to sequential time integrals of successive time periods of said last-mentioned signal; and means receiving said outputs and algebraically combining the same in pairs to provide a step function thereof.

2. In combination, means providing a signal slowly varying with time, said means comprising a synchronous rectifier receiving an alternating signal varying with time and of reversed phase during successive time periods, said rectifier receiving also a synchronizing signal and providing said signal slowly varying with time; means responsive to said last-mentioned signal providing successive outputs corresponding to sequential time integrals of successive time periods of said last-mentioned signal; and means receiving said outputs and algebraically combining the same in pairs to provide a step function thereof.

References Cited in the file of this patent

UNITED STATES PATENTS

| | | |
|---|---|---|
| 1,851,092 | Fetter | Mar. 29, 1932 |
| 2,264,621 | Cox | Dec. 2, 1941 |
| 2,526,509 | Shawhan | Oct. 17, 1950 |
| 2,532,338 | Schlesinger | Dec. 5, 1950 |
| 2,662,118 | Schouten | Dec. 8, 1953 |
| 2,769,935 | Williams et al. | Nov. 6, 1956 |

FOREIGN PATENTS

| | | |
|---|---|---|
| 650,472 | Great Britain | Feb. 28, 1951 |